J. M. STARK & T. L. TURNER.
MACHINE FOR APPLYING CAPS TO BOTTLES.
APPLICATION FILED NOV. 13, 1908.
958,333.
Patented May 17, 1910.
8 SHEETS—SHEET 1.
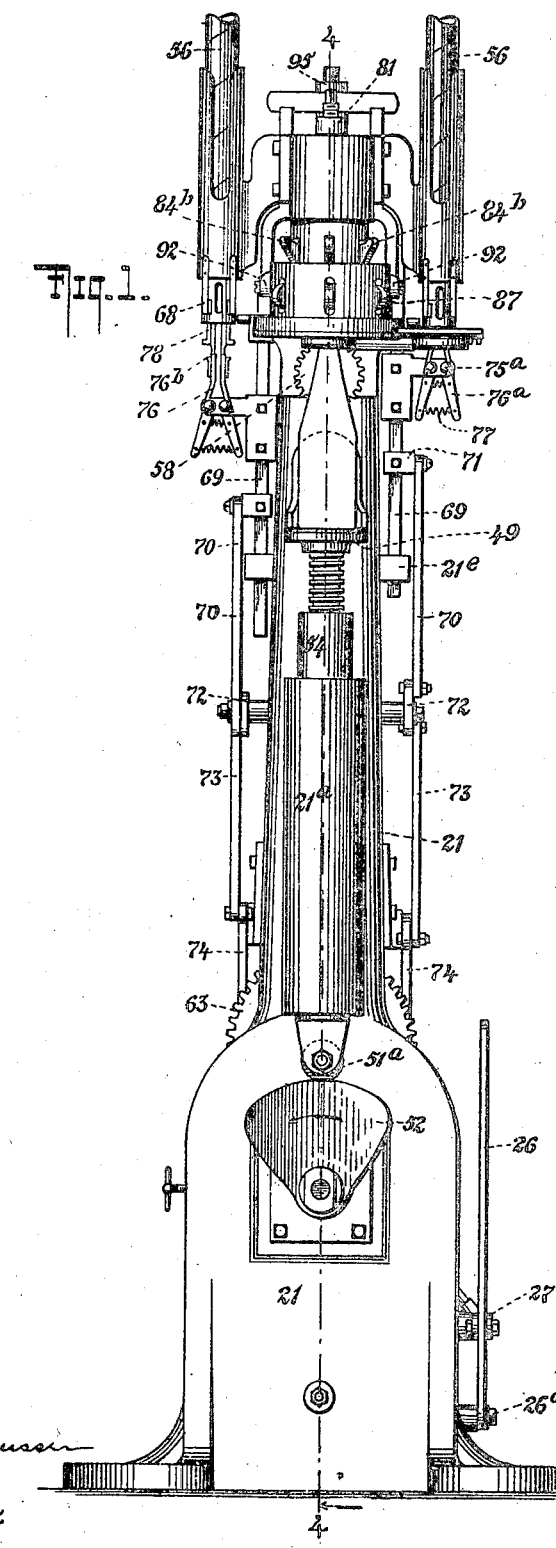
WITNESSES
INVENTORS
JOHN M. STARK
THOMAS L. TURNER
BY
ATTORNEYS

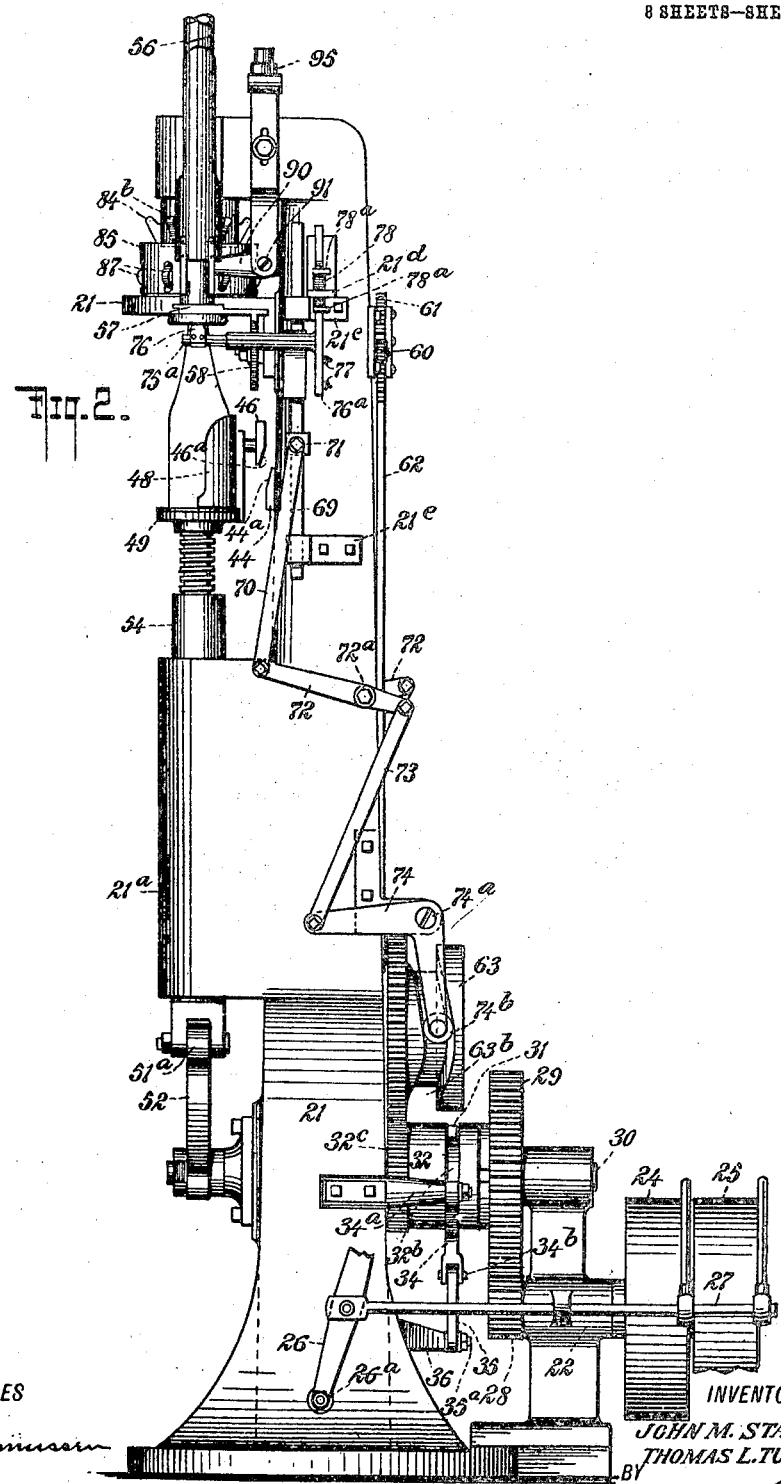

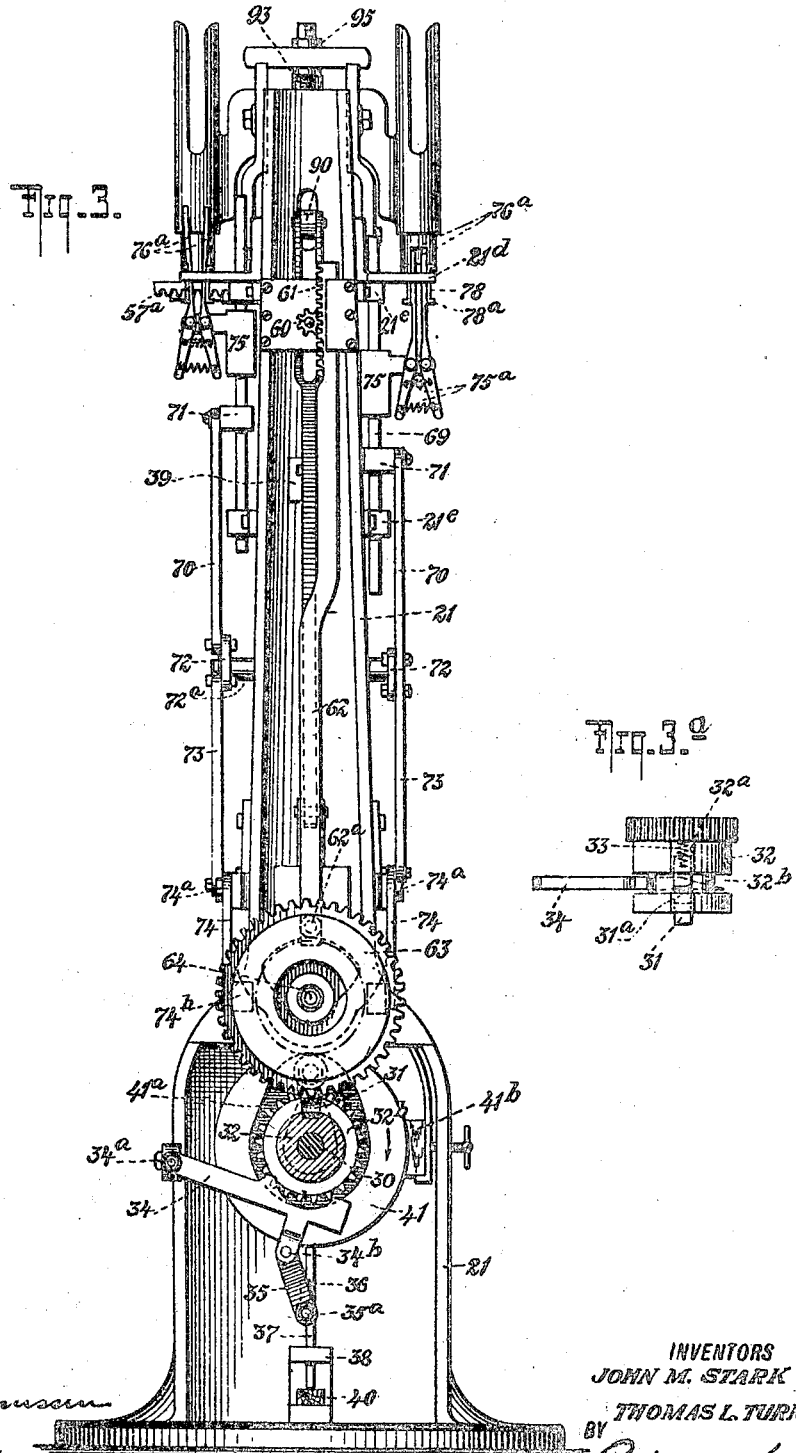

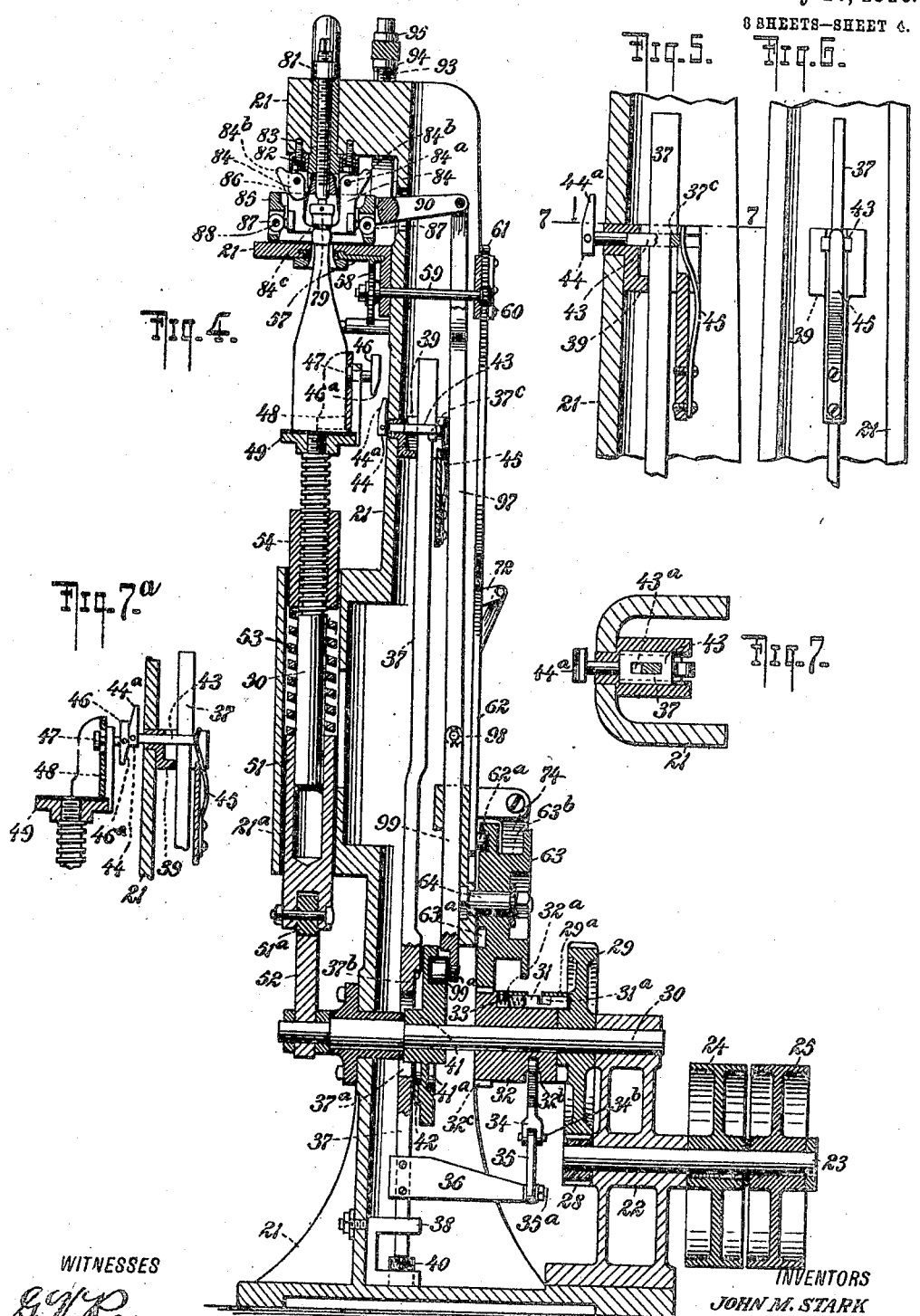

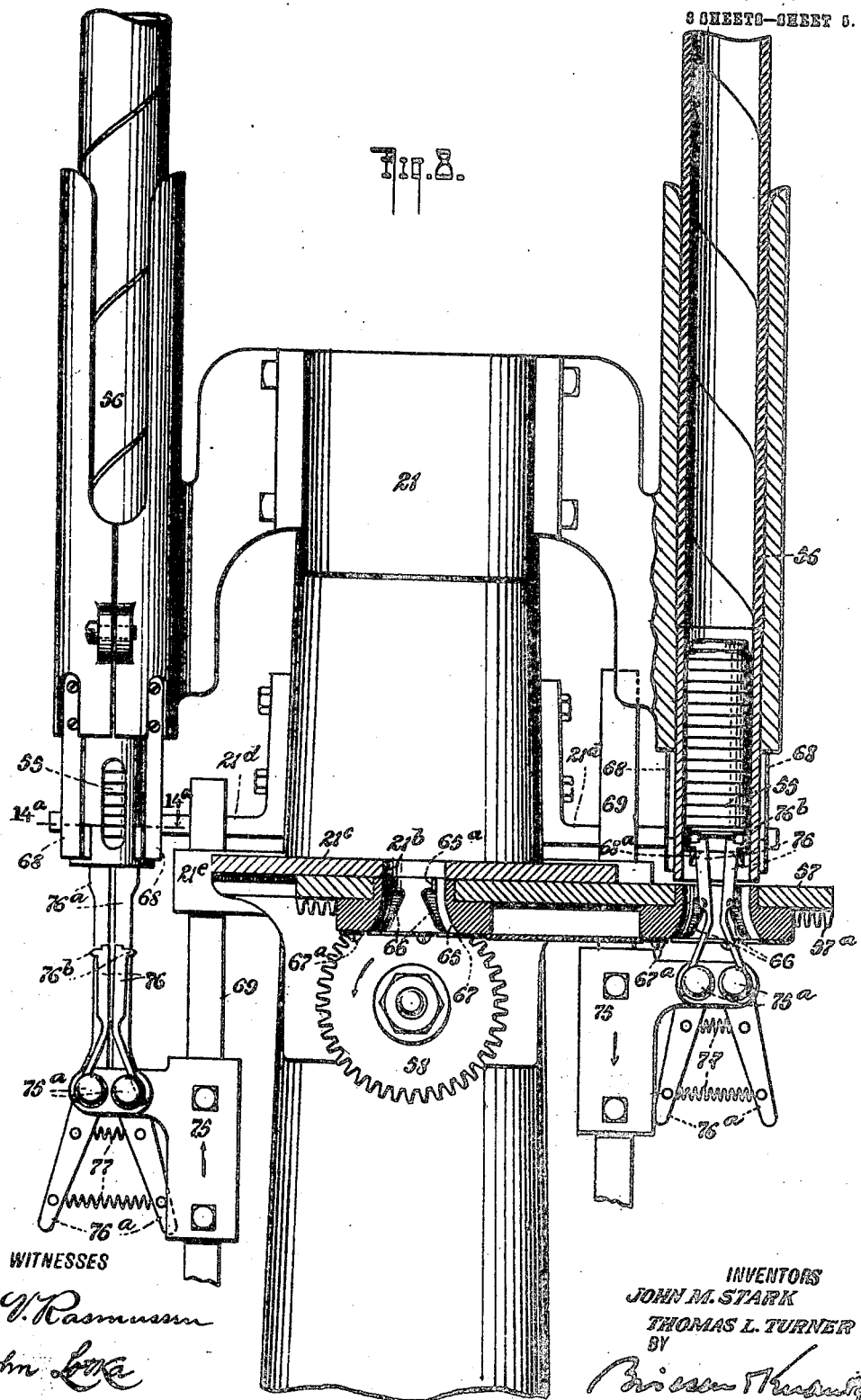

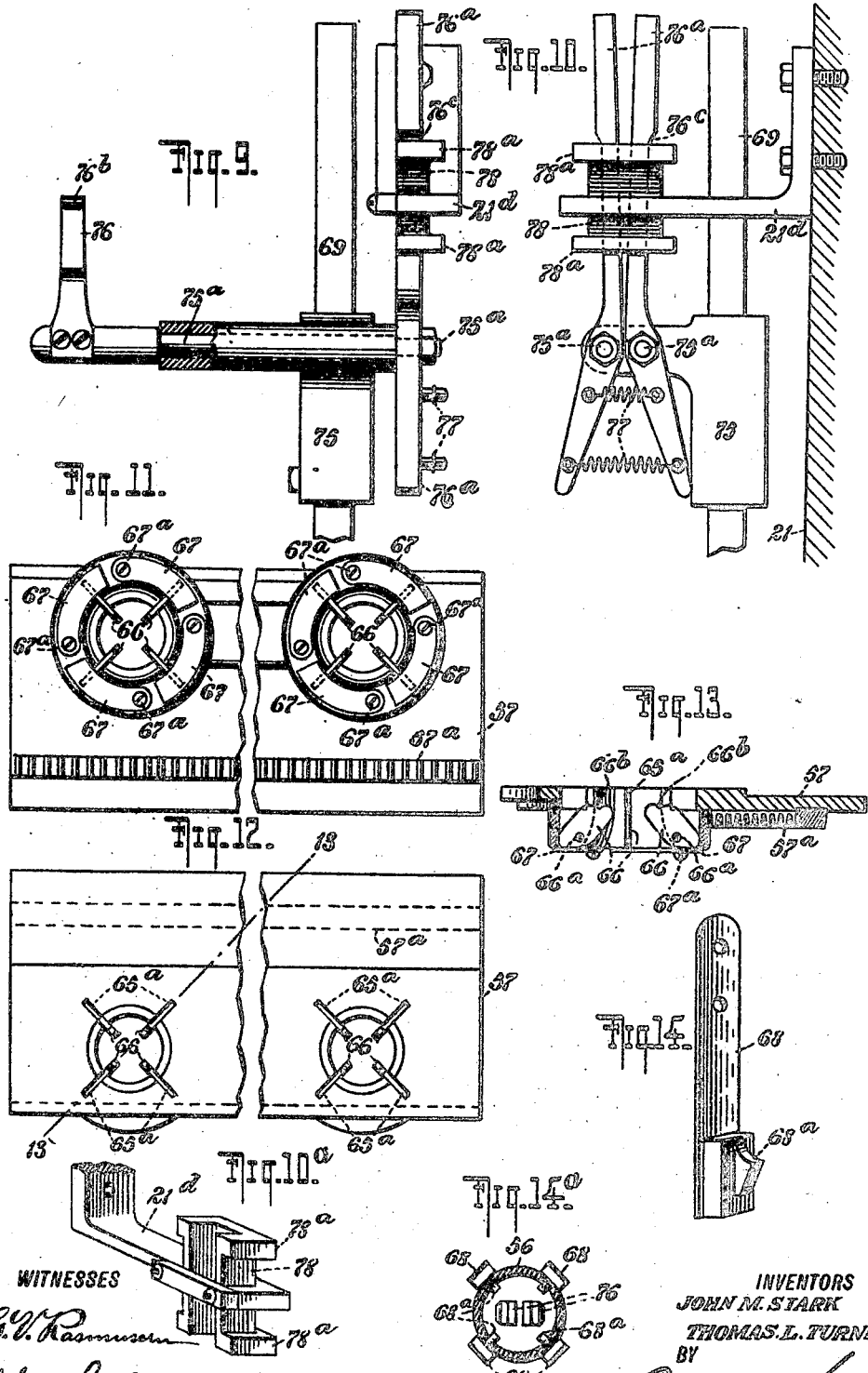

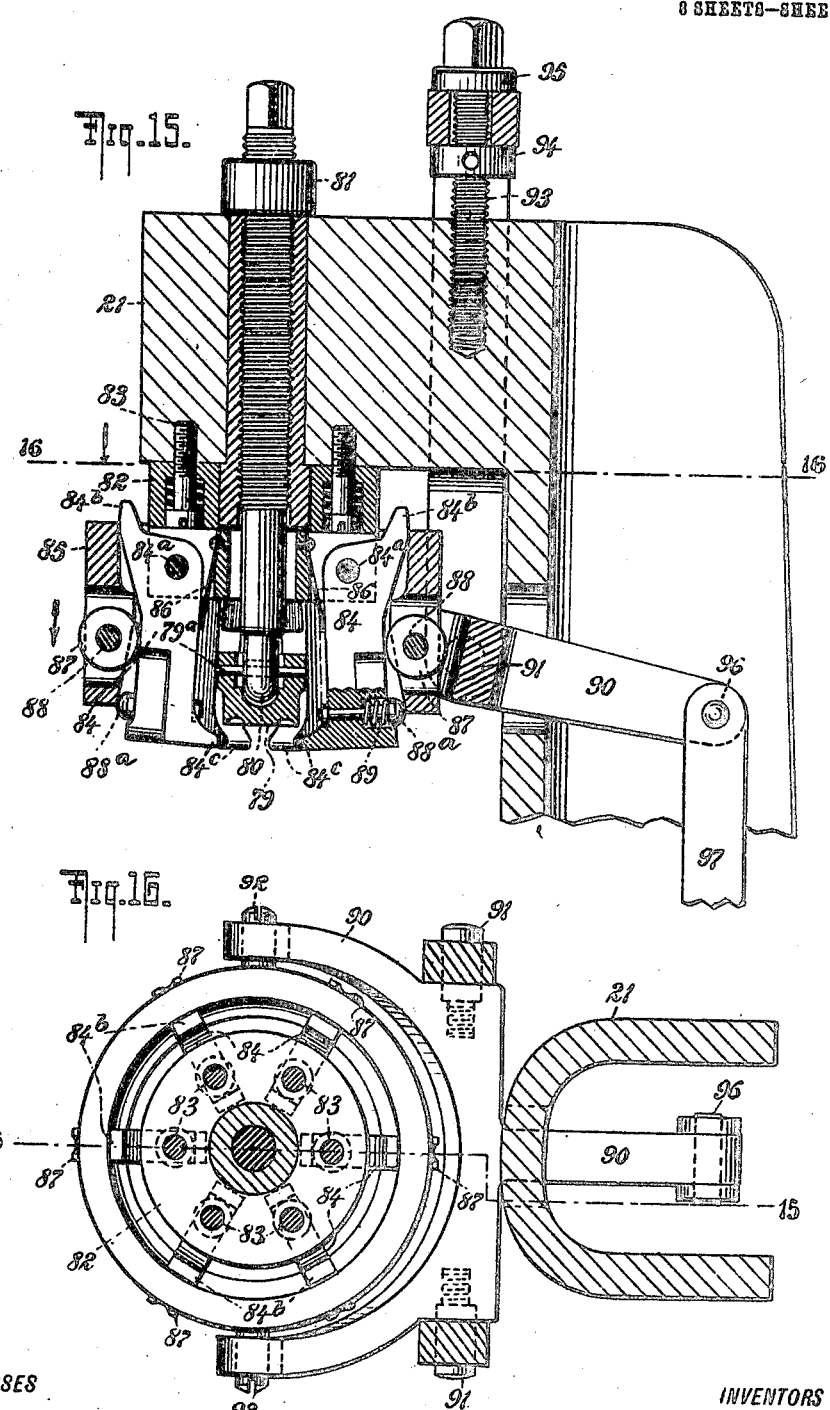

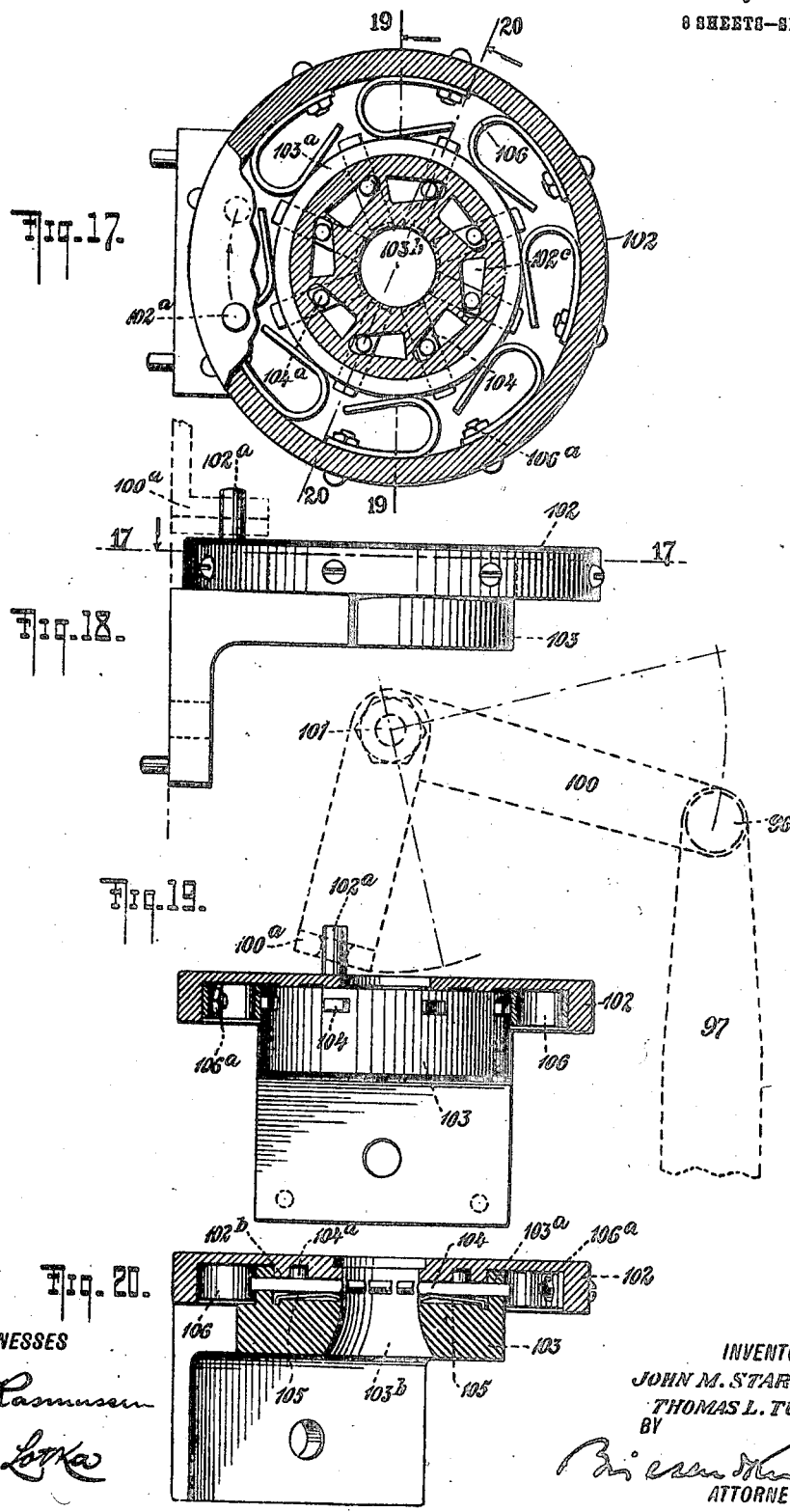

UNITED STATES PATENT OFFICE.

JOHN M. STARK AND THOMAS L. TURNER, OF NEW YORK, N. Y., ASSIGNORS TO BOTTLERS' SEAL COMPANY, OF NEW YORK, N. Y., A CORPORATION OF NEW YORK.

MACHINE FOR APPLYING CAPS TO BOTTLES.

958,333.

Specification of Letters Patent. Patented May 17, 1910.

Application filed November 13, 1908. Serial No. 462,445.

*To all whom it may concern:*

Be it known that we, JOHN M. STARK and THOMAS L. TURNER, both citizens of the United States, and residents of the borough of Manhattan, city, county, and State of New York, have jointly invented certain new and useful Improvements in Machines for Applying Caps to Bottles, of which the following is a specification.

Our invention relates to machines for applying sheet metal caps to bottles and other receptacles and has for its object to provide a sufficient mechanism for this purpose, which will be automatic and reliable in its operation.

In the accompanying drawings we have illustrated two specific embodiments of our invention, Figures 1–16 illustrating the first form of our invention and Figs. 17–20 another form of certain parts of the machine.

Fig. 1 is a front elevation of the complete machine; Fig. 2 is a side elevation thereof; Fig. 3 is a rear elevation with parts in section; Fig. 3ª is a detail of the starting mechanism; Fig. 4 is a sectional elevation on line 4—4 of Fig. 1; Fig. 5 is a detail showing in vertical section certain trip mechanism hereinafter referred to; Fig. 6 is a face view of said mechanism from the inside; Fig. 7 is a horizontal section on line 7—7 of Fig. 5; Fig. 7ᴬ is a vertical section showing certain parts of Fig. 4 in their initial position; Fig. 8 is a view of the upper portion of the machine with parts in section drawn upon enlarged scale; Fig. 9 is a side view of the cap-feeding mechanism; Fig. 10 is a rear view of said mechanism; Fig. 10ᴬ shows parts of this mechanism in perspective; Fig. 11 is a partial bottom view of the slide or cap-carrier which is employed to carry the caps into registry with the bottle; Fig. 12 is a top view of said slide; Fig. 13 is a vertical section on line 13—13 of Fig. 12; Fig. 14 is a detail perspective view of a spring used in conjunction with the cap magazine; Fig. 14ᴬ is a horizontal section on line 14ᴬ—14ᴬ of Fig. 8; Fig. 15 is a section of the upper part of the machine on line 15—15 of Fig 16; Fig. 16 is a horizontal section on line 16—16 of Fig. 15; Fig. 17 is a horizontal section on line 17—17 of Fig. 18, the latter showing in side elevation so much of the second form of our machine as differs from the first form thereof; Figs. 19 and 20 are vertical sections on line 19—19 and 20—20 respectively of Fig. 17.

The frame 21 of the machine is provided with suitable bearings 22 for the main shaft 23 carrying a fast pulley 24 and a loose pulley 25. The driving belt (not shown) may be shifted from one pulley to the other by means of the well-known shifting mechanism, Fig. 2 showing a lever 26, fulcrumed at 26ª and connected with the shifting rod 27. On the shaft 23 is secured rigidly a pinion 28 in mesh with a gear wheel 29 which is loose upon a countershaft 30. The gear wheel 29 has a longitudinal groove 29ª adapted to receive at times a coupling pin 31 which is carried in a longitudinal guideway 32ª of a clutch-wheel 32 fast upon the shaft 30. A spring 33 tends to throw the pin 31 toward the gear wheel 29, so as to couple the latter for rotation with the shaft 30. The pin 31 is provided with a notch 31ª adapted to register with an annular groove 32ᵇ when the pin 31 is withdrawn against the tension of the spring 33. This withdrawal is effected by the lowering of a trip lever 34 which is fulcrumed at 34ª and has a pivotal connection at 34ᵇ with a toggle link 35 pivoted at 35ª to a bracket 36 which is secured rigidly to a bar 37 having vertical movement in suitable guides 38—39. At the bottom I may provide a cushion 40 of wood or other suitable material so as to deaden the shock and noise at the time the bar 37 drops down. This bar is provided with an opening 37ª through which extends the shaft 30 and the hub 41 of a cam 42 rigid with said shaft. The cam 42 is adapted at certain times to engage a shoulder 37ᵇ on the bar 37 and thus to raise said bar from the position shown in Figs. 3 and 4 to that illustrated in Figs. 5 and 6. The trip lever 34, when raised, is adapted for engagement with the clutch pin 31 at the notch thereof, the end of the lever being beveled (see Fig. 3ª) so that, as the pin rotates with the member 32, the side wall of the notch 31ª will come into engagement with the raised trip lever 34 and thus the pin 31 will be moved toward the left in Fig. 4, thereby disengaging it from the gear wheel 29 and thus stopping the rotation of the shaft 30. A brake 41ᵇ engages the periphery of the hub 41 frictionally to prevent the momentum of the parts from carrying them beyond the point where the driving action ceases.

The upper end of the bar 37 is provided with a shoulder 37ᶜ adapted to engage the upper surface of a slide 43 mounted to move horizontally in the frame 21 and projecting therefrom. The projecting end of the slide is provided with a finger 44 having a beveled surface 44ᵃ and the inner end of the slide is engaged by a spring 45 which tends to throw it outward into the position shown in Fig. 5. It will be seen that in this position the slide 43 keeps the bar 37 in its raised position, with the shoulder 37ᶜ resting on the upper surface of the slide. If now the slide is pushed inward, in the manner to be set forth presently, the shoulder 37ᶜ is released and the bar 37 is free to drop by its own weight in the slot 43ᵃ, this dropping of the bar operating to release the pin 31 from the trip lever 34 so that the pin is shot forward by the spring 33 into the recess 29ᵃ as soon as the rotation of the driving wheel 29 brings this recess into registry with the clutch pin.

The inward movement of the slide 43 and the consequent starting of the shaft 30 are accomplished as follows: In the position of rest illustrated by Fig. 7ᵃ the projected finger 44 is in engagement with a finger 46 which is carried by a slide 47 movable horizontally in the curved wall 48 carried by a bottle support 49. In this position the head of the slide 47 projects from the wall 48. If now a bottle is placed on the support 49 and moved into engagement with the curved wall 48, this will push the slide 47 toward the right and owing to the engagement of the fingers 46 and 44 the slide 43 will also be moved to the right thus releasing the bar 37 and starting the rotation of the shaft 30 as above described.

The bottle support 49 is carried by a rod 50 fitted at its lower end into a sleeve 51 guided vertically in a suitable portion 21ᵃ of the machine and provided with a roller 51ᵃ which rides on a cam 52 secured rigidly to the shaft 30. A spring 53 is interposed between the end of the sleeve 51 and a collar 54 secured to the rod 50. In order that the tension of the spring may be varied, I prefer to make the collar 54 adjustable as by screwing it on a threaded portion of the rod 50. It will be understood that for each rotation of the shaft 30 there is one upward movement and one downward movement of the bottle support 49. The cam 42 is so arranged that before the bottle support returns to its lower position the bar 37 is raised so as to again allow the spring 45 to project the slide 44 into the position shown in Figs. 5 and 7ᵃ. Therefore, when the two inclined surfaces 46ᵃ and 44ᵃ come into engagement during the downward movement of the bottle support, this will cause the slide 47 to be moved toward the left so as to take the position shown in Fig. 7ᵃ and this movement will push the bottle toward the left so as to facilitate its movement by the operator. The raising of the bottle support brings the bottle into operative relation to a cap carrier or shuttle and to a crimping head by which the cap is secured upon the bottle.

The caps 55 are stacked in magazines 56 disposed vertically at equal distances from the axis of the machine indicated by the center of a hole 21ᵇ (see Fig. 8). This hole is located in a suitable guide plate 21ᶜ in which the shuttle or cap carrier 57 is adapted to reciprocate horizontally. This shuttle is provided with two cap holders, the distance between them being equal to the distance between each of the magazines 56 and the central opening 21ᵇ. Therefore, when one of the cap-holders is in registry with one of the magazines 56, the other is in registry with the central hole 21ᵇ. In order to move the shuttle 57, we have provided it with a rack 57ᵃ which is engaged by a pinion 58 mounted upon a horizontal shaft 59 which also carries a pinion 60. This pinion is engaged by a rack 61 located at the upper end of a bar 62 to which a vertical movement is imparted by means of a cam groove 63ᵃ on a wheel 63 which is rotated upon a stud 64 by means of gear teeth 32ᶜ on the member 32. The bar 62 is provided with a pin 62ᵃ projecting into the cam groove 63ᵃ.

The construction of the cap-holders is shown best in Figs. 8, 11, 12 and 13. Each cap-holder has a downwardly flaring opening 65 with slots 65ᵃ through which project carrying fingers 66 pivoted at 66ᵃ and provided with shoulders 66ᵇ on which the lower edge of the cap is adapted to rest. Springs 67 secured at 67ᵃ and bearing on the fingers 66 from below, tend to keep them in the inwardly projecting position, but may be swung outward by the bottle neck when the same rises through the cap holder as shown in Fig. 4.

The lowermost cap 55 rests on curved seats 68ᵃ of springs 68, which are secured to the lower portion of the magazines 56, and project partly into the magazine. In order to transfer the lowermost cap from the magazine to one of the cap holders the following mechanism is provided (see particularly Figs. 8, 9, and 10): rods 69 are guided vertically in suitable brackets 21ᵉ and these rods receive a reciprocating movement in opposite directions, that is when one rod is up the other rod is down and vice versa. For this purpose links 70 are connected pivotally with blocks 71 carried by said rods 69, the lower ends of said links being connected with levers 72 fulcrumed at 72ᵃ and connected by links 73 with elbow levers 74 fulcrumed at 74ᵃ (see especially Fig. 2). Each of the elbow levers 74 carries a roll 74ᵇ engaging a cam groove 63ᵇ on the wheel 63. This cam groove is so fashioned as to give the rods 69 the opposite reciprocating motion referred to above. Each of the rods 69 carries a bracket 75, on which are fulcrumed at 75ᵃ two cap transferrers 76 and operating levers 76ᵃ. Springs 77 tend to throw apart the upper ends of the cap transferrers as shown in Figs. 8 and 10. These transferrers are provided with projections 76ᵇ adapted to frictionally engage the lowermost cap as shown at the right in Fig. 8. It will therefore be seen that when one of the brackets 75 is raised as shown at the right of Fig. 8 the corresponding transferrer comes into operative engagement with the lowermost cap on that side. When thereupon the transferrer moves down with the bracket 75 it carries said cap with it, the springs 68 yielding downward to permit such movement, but snapping back at once so as to hold the succeeding cap. As soon as the lower edge of the cap comes to rest on the fingers 66 at the recesses 66ᵇ, the further downward movement of the transferrer will disengage it from the cap, so that the cap will remain within the cap-holder while the extractor or transferrer will pass to a lower position in which, as shown at the left in Fig. 8, it is entirely clear of the path of the shuttle 57 and of the cap holders carried thereby.

In order to facilitate the disengagement of the cap transferrer from the cap, I prefer to arrange upon each of the operating levers 76 of the transferrer a slide 78, guided in the bracket 21ᵈ and having its movement therein limited by the projecting heads 78ᵃ and thus during the downward movement of the cap transferrer the slide 78 will at first move in unison with the transferrer-lever so as to leave the upper ends of the transferrer jaws separated under the influence of the springs 77. As soon as the upper head 78ᵃ engages the bracket 21ᵈ the transferrer levers 76ᵃ will move downward in the slide 78 and the beveled surfaces 76ᶜ will cause the transferrer jaws to move toward each other, thus releasing the cap. This, of course, occurs at about the same time that the cap reaches the fingers 66. During the upward movement of the bracket 75 the jaws will first remain closed and will not open until the lower head 78ᵃ has engaged the bracket 21ᵈ; thus the insertion of the cap transferrer into the cap is facilitated.

It will be understood that at the beginning of the operation a cap is transferred from one of the magazines to the cap holder and carried thereby to the central position in registry with the bottle and thereupon the bottle rises through the action of the cam 52 to lift the cap from the cap holder as shown in Fig. 4, the top of the cap being thus brought into engagement with a backing 79 (see Fig. 15). This backing is capable of a slight movement in all directions, being provided with a spherical socket engaging the rounded end of a rod 80 and being also provided with a transverse pin 79ᵃ, which passes with considerable play through a corresponding opening in the rod 80. The height of the opening is such that the socket will engage the rounded end of the rod before the pin engages the upper wall of the opening. Thus the head 79 is left free to swing in any direction so as to accommodate itself to irregularities in the shape of the bottle mouth. The lower face of the head 79 is preferably shaped with an annular groove corresponding to the bottle mouth. In order that the apparatus may be set for bottles of varying height, the head 79 and rod 80 are preferably adjustable, as by threading the rod into the upper part of the machine and locking it by means of a nut 81.

The lower edge of the cap is bent inward or crimped by means of the following mechanism: A jaw carrier 82 is secured to the upper portion of the machine frame, for instance by means of screws 83 and preferably the connection is an elastic one so as to permit the carrier to yield downward under certain conditions hereinafter referred to. This carrier is provided with radial slots in which crimping jaws 84 are mounted to swing about horizontal pivots 84ᵃ. The upper ends of these jaws have heels 84ᵇ which engage the inner wall of a vertically movable operating sleeve 85 so that with the sleeve in its upper position as in Fig. 15 the lower ends of the jaws 84 are swung open under the influence of springs 86. These lower ends are provided with inward projections 84ᶜ, adapted to crimp the flange under the bead at the upper end of the bottle neck.

The operating sleeve 85 is provided with a number of rollers 87 rotating about horizontal axes 88 and arranged to engage the outer surfaces of the jaws 84, which surfaces are normally inclined. When the operating sleeve 85 moves downward from the position shown in Fig. 15, the rollers 87 will gradually force the jaws 84 inward at their lower ends. At the end of this movement the rollers 87 will engage small plungers 88ᵃ sliding transversely in the jaws and pressed outward by springs 89. The ends of these plungers are preferably rounded and the rollers 87 concaved correspondingly as shown in Fig. 16. The purpose of this arrangement is to exert a yielding pressure at the end of the crimping operation so as to prevent breakage of the bottle such as might occur if the strongest pressure exerted were a rigid pressure. The operating sleeve 85 is moved up and down relatively to the jaws 84 by means of a forked lever 90, which is fulcrumed at 91 and pivotally connected with said sleeve at 92. Preferably the fulcrum 91 is adjustable as by means of a screw 93 and nuts 94—95. The end of the lever 90 is pivotally connected at 96 with a link 97 the lower end of which is pivotally connected at 98 with a vertically reciprocating rod 99, the lower end of which is provided with a roller $99^a$ working in a cam groove $41^a$.

The gearing by which the wheel 63 is driven from the shaft 30 is such as to give said wheel one revolution for each two revolutions of the shaft, thus bringing the cap-holders alternately into operative relation to the bottle.

The elastic connection between the jaw-carrier 82 and the frame of the machine enables this carrier to yield slightly as the operating sleeve 85 reaches the limit of its downward movement, thus further guarding against injury to the bottle.

After the crimping operation, the operating sleeve 85 moves upward to allow the jaws 84 to spread apart and release the bottle, which then travels downward by gravity as the cam 52 permits such movement. As the support 49 approaches the position shown in Fig. $7^a$, the engagement of the members 44, 46 will shift the bottle horizontally as hereinbefore described. The raising of the bar 37 by the cam 42 not only allows the slide 44 to be projected to the position shown in Figs. 5 and $7^a$, but also stops the rotation of the shaft 30 through the action of the shift lever 34.

The construction shown in Figs. 17 to 20 differs from that described above only in the crimping mechanism. The upper end of the link 97 is pivotally connected at 96 with an elbow lever 100 fulcrumed at 101 and having a perforated lug $100^a$ into which projects a pin $102^a$ secured to an operating sleeve 102. This sleeve is mounted to turn in a horizontal plane, being provided with an annular rib $102^b$ fitted within a rib $103^a$ of a stationary member 103 having a central opening $103^b$ which corresponds to the opening $21^b$ of Fig. 8. The shuttle or cap-carrier 57 would be arranged to reciprocate beneath this member 103 in the same manner as hereinbefore described. Crimping pins 104 are movable radially through openings leading to the central opening $103^b$, these pins being pressed upward against the sleeve 102 by springs 105, and having their outer ends projected through the rib $103^a$. These projecting ends are adapted to be engaged and forced inward with a yielding pressure, by springs 106, secured at $106^a$ to the operating sleeve 102. The pins 104 are further provided with lugs $104^a$ projecting into recesses or chambers $102^c$ of the sleeve 102. Only the inner walls of these recesses are active, operating to withdraw the pins 104 when the sleeve is turned in the direction opposite to that indicated by the arrow in Fig. 17. When the sleeve is turned in the direction indicated by said arrow, these pins 104 remain practically stationary until engaged by the springs 106, and even then they are not forced inward positively, but yieldingly thus avoiding injury to the bottle. The chambers $102^c$ are for this purpose made wider at one end than at the other, so as to give the lugs $104^a$ considerable play. A sufficient number of pins 104 are provided to crimp the flange of the cap by the inward movement of said pin. It will be understood that the backing 79, such as shown in Fig. 15 is also used in conjunction with the crimping mechanism of Figs. 17-20, and the recess shown in the top surface of the sleeve 102 in Figs. 19 and 20 is indented for the reception of said backing 79.

The term "bottle" as used herein is to be given a broad meaning to include jars and other receptacles.

We claim as our invention:

1. The combination of a bottle support, a shaft having operative connections to move said support, means, controlled by the placing of a bottle on said support, for starting the rotation of the shaft, and cap-applying mechanism controlled by said shaft.

2. The combination of a bottle support, means for moving it, mechanism for applying a cap to the bottle, and means, controlled by the placing of a bottle on said support, for starting the operation of the machine.

3. The combination of a bottle support having a movable member arranged to be shifted by the placing of a bottle on the support, starting mechanism arranged to be thrown into action by the movement of said member, and mechanism, controlled by said starting mechanism, for applying a cap to the bottle.

4. The combination of a bottle support, a slide adapted to be moved thereon transversely by engagement with a bottle, a second slide engaged by the first slide in the initial position thereof, a starting mechanism normally held inactively by the second slide but adapted for release by the movement of said slide, and cap-applying mechanism controlled by said starting mechanism.

5. The combination of a vertically movable bottle support, a slide adapted to be moved thereon transversely by engagement with a bottle, a second slide engaged by the first slide in the initial position thereof, a starting mechanism normally held inactive by the second slide, a shaft the rotation of which is controlled by said starting mechanism cap applying mechanism operated by said shaft, and means, actuated by the shaft, for bringing the starting mechanism back to its original position in which it causes the shaft to remain stationary.

6. The combination of a vertically movable bottle support, a slide adapted to be moved thereon transversely by engagement with a bottle, a second slide spring-pressed toward the first slide and engaged thereby in its initial position, a vertically movable bar arranged to be locked in its elevated position by the second slide and to be released when the said slide moves against the tension of its spring, a shaft the rotation of which is controlled by said bar, cap-applying mechanism operated by said shaft, and means, actuated by the shaft, for returning said bar to its raised position in which it causes the shaft to remain stationary.

7. The combination of a bottle support, cap-carrying mechanism in line therewith, two cap magazines located on opposite sides of said mechanism, a cap carrier movable into registry with the support and also into registry with either magazine, and means for transferring caps from the magazines to the carrier.

8. The combination of the bottle support, the transversely movable cap carrier having a flaring opening, outwardly resilient fingers pivoted to the holder about transverse axes and arranged to project into said opening and means for applying a cap carried by the holder to a bottle.

9. The combination of the bottle support, a rod in line therewith, a backing adapted to engage the cap and having a universal joint connection with said rod and crimping mechanism adjacent to said backing.

10. The combination of the bottle support, a rod in line therewith, provided with a rounded end, a backing adapted to engage the cap and having a rounded socket adapted for universal movement on the rounded end of said rod, and a crimping mechanism adjacent to the backing.

11. The combination of the bottle support, the normally stationary cap engaging backing in line with said support, means for adjusting said backing toward and from the cap support, crimping jaws adjacent to said backing and operating sleeve controlling the position of the crimping jaws, a lever for moving said sleeve and an adjustable fulcrum for said lever.

12. The combination of cap applying means and a bottle support having a relative movement toward and from each other, mechanism for effecting such movement and means associated with said bottle support for starting the mechanism which effects the said relative movement between the cap-applying means and the bottle support.

13. The combination of cap-applying means and a bottle support having a relative movement toward and from each other, with mechanism for effecting such movement, and means associated with said bottle support for starting the operation of said mechanism, said means being operative by the positioning of a bottle relative to said support.

14. The combination of cap-applying means and a bottle support with means associated with said bottle support for starting the mechanism which actuates said cap-applying means.

15. The combination of cap-applying means and a bottle support with means associated with said bottle support for actuating said cap-applying means, said means being operative by the positioning of a bottle relative to said support.

16. In a bottle capping machine, the combination of a cap magazine, a cap carrier, a cap transferrer, cap applying mechanism, a bottle support movable to and from said cap applying mechanism and means associated with said bottle support for starting the operation of said machine and operative by the positioning of said bottle relative to said support.

17. In a machine of the character described, the combination of two cap magazines spaced apart; cap-applying devices located between said magazines; a cap carrier having a cap holder for each magazine and reciprocating between said magazines so as to bring each cap holder in register with its magazine and with said cap-applying devices; and a cap transferrer for each magazine.

18. In a machine of the character described, the combination of two cap magazines spaced apart; cap-applying devices located between said magazines; a horizontal cap carrier having a cap holder for each magazine and reciprocating between said magazines so as to bring each cap holder in register with its magazine and with said cap-applying devices; a cap transferrer for each magazine; and a vertically reciprocating bottle holder moving in alinement with said cap-applying devices.

19. In a machine of the character described, the combination of two cap magazines spaced apart; cap-applying devices located between said magazines; a cap carrier having a cap holder for each magazine and reciprocating between said magazines so as to bring each cap holder in register with its magazine and with said cap-applying devices, each cap holder comprising a part of the cap carrier provided with an aperture having a set of spring pressed fingers therein; and a cap transferrer for each magazine.

20. In a machine of the character described, the combination of two cap magazines spaced apart; cap-applying devices located between said magazines; a cap carrier having a cap holder for each magazine and reciprocating between said magazines so as to bring each cap holder in register with its magazine and with said cap-applying devices, each cap holder comprising a part of the cap carrier provided with an aperture having a set of spring pressed fingers therein; and a cap transferrer for each magazine, having a reciprocating movement through a cap holder into and out of its magazine.

21. In a machine of the character described, the combination of two cap magazines spaced apart; cap applying devices located between said magazines; a horizontal cap carrier having a cap holder for each magazine and reciprocating between said magazines so as to bring each cap holder in register with its magazine and with said cap-applying devices, each cap holder comprising a part of the cap-carrier provided with an aperture having a set of spring pressed fingers therein; a cap transferrer for each magazine having a reciprocating movement through a cap holder into and out of its magazine; and a vertically reciprocating bottle holder moving in alinement with said cap-applying devices.

22. The combination of the frame, the backing carried by said frame, the spring retracted crimping jaws surrounding the backing and having spring plungers, and the operating sleeve movable lengthwise of the jaws.

23. The combination of the cap transferrer having jaws movable to and from each other and carried on the ends of rocking arms, spring pressed levers mounted on the opposite ends of said rocking arms, a slide carried on said levers and movable thereon, and a fixed bracket to limit the movement of said slide.

24. The combination of the frame, the backing movably carried by said frame, the spring retracted crimping jaws surrounding the backing and having spring plungers and an operating sleeve movable lengthwise of the jaws.

In testimony whereof we have signed this specification in the presence of two subscribing witnesses.

JOHN M. STARK.
THOMAS L. TURNER.

Witnesses:
JOHN LOTKA,
JOHN A. KEHLENBECK.